United States Patent
Itoh et al.

(10) Patent No.: US 11,276,391 B2
(45) Date of Patent: Mar. 15, 2022

(54) GENERATION OF MATCHED CORPUS FOR LANGUAGE MODEL TRAINING

(71) Applicant: INTERNATIONAL BUSINESS MACHINES CORPORATION, Armonk, NY (US)

(72) Inventors: Nobuyasu Itoh, Kanagawa (JP); Gakuto Kurata, Tokyo (JP); Masayuki Suzuki, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 134 days.

(21) Appl. No.: 16/783,402

(22) Filed: Feb. 6, 2020

(65) Prior Publication Data
US 2021/0248996 A1    Aug. 12, 2021

(51) Int. Cl.
*G10L 15/183* (2013.01)
*G10L 15/06* (2013.01)

(52) U.S. Cl.
CPC .......... *G10L 15/063* (2013.01); *G10L 15/183* (2013.01)

(58) Field of Classification Search
CPC ....... G10L 15/063; G10L 15/22; G10L 15/18; G10L 15/26; G06F 40/103; G06F 16/3344
See application file for complete search history.

(56) References Cited

U.S. PATENT DOCUMENTS

| | | | | |
|---|---|---|---|---|
| 5,477,451 | A * | 12/1995 | Brown | G06F 40/55 704/9 |
| 6,560,616 | B1 * | 5/2003 | Garber | G06F 40/103 |
| 7,890,860 | B1 * | 2/2011 | Thrasher | G06F 40/166 715/260 |
| 2002/0102526 | A1 * | 8/2002 | Tsukamoto | G09B 7/00 434/362 |
| 2002/0103870 | A1 * | 8/2002 | Shouji | G06F 40/151 709/206 |
| 2003/0061023 | A1 * | 3/2003 | Menezes | G06F 40/45 704/4 |
| 2005/0234709 | A1 * | 10/2005 | Klavans | G06F 40/242 704/10 |
| 2006/0149558 | A1 * | 7/2006 | Kahn | G10L 15/18 704/278 |

(Continued)

OTHER PUBLICATIONS

Seymore, Kristie, et al., "Nonlinear interpolation of topic models for language model adaptation," Fifth International Conference on Spoken Language Processing, Dec. 1998, 4 pages.

(Continued)

*Primary Examiner* — Jakieda R Jackson
(74) *Attorney, Agent, or Firm* — Tutunjian & Bitetto, P.C.; Randall Bluestone

(57) ABSTRACT

A computer-implemented method for generating a text is disclosed. The method includes obtaining a first text collection matched with a target domain and a second text collection including a plurality of samples, each of which describes rewriting between a first text and a second text that has a style different from the first text. The method also includes training a text generation model with the first text collection and the second text collection, in which the text generation model has, in a vocabulary, one or more operation tokens indicating rewriting. The method further includes outputting a plurality of texts obtained from the text generation model.

20 Claims, 6 Drawing Sheets

(56) References Cited

U.S. PATENT DOCUMENTS

| | | | | |
|---|---|---|---|---|
| 2010/0121631 | A1* | 5/2010 | Bonnet | G06K 9/723 704/9 |
| 2013/0006636 | A1* | 1/2013 | Mizuguchi | G06F 16/313 704/245 |
| 2013/0152092 | A1* | 6/2013 | Yadgar | G10L 15/22 718/102 |
| 2013/0246039 | A1* | 9/2013 | Duneau | G06T 11/60 704/2 |
| 2013/0343639 | A1* | 12/2013 | Benko | G06T 11/60 382/155 |
| 2015/0082159 | A1* | 3/2015 | DeLuca | G06F 3/0485 715/271 |
| 2015/0332670 | A1 | 11/2015 | Akbacak et al. | |
| 2016/0267905 | A1* | 9/2016 | Levit | G10L 15/183 |
| 2016/0365090 | A1 | 12/2016 | Nissan | |
| 2017/0046311 | A1* | 2/2017 | Walker | G06F 40/30 |
| 2017/0075877 | A1* | 3/2017 | Lepeltier | G06F 40/205 |
| 2017/0270193 | A1* | 9/2017 | Misra | G06F 16/338 |
| 2018/0033329 | A1* | 2/2018 | Suleiman | G09B 17/04 |
| 2018/0114524 | A1 | 4/2018 | Itoh et al. | |
| 2019/0108257 | A1* | 4/2019 | Lefebure | G06F 16/3329 |
| 2019/0138539 | A1 | 5/2019 | Moreno Mengibar et al. | |
| 2019/0369969 | A1* | 12/2019 | Donohoe | G06F 9/455 |
| 2020/0327189 | A1* | 10/2020 | Li | G06F 40/166 |
| 2021/0165960 | A1* | 6/2021 | Eisenschlos | G06F 40/30 |

OTHER PUBLICATIONS

Neubig, Graham, et al. "A WFST-based Log-linear Framework for Speaking-style Transformation," Tenth Annual Conference of the International Speech Communication Association, Sep. 2009, pp. 1495-1498.

Akita, Yuya, et al., "Topic-independent speaking-style transformation of language model for spontaneous speech recognition," 2007 IEEE International Conference on Acoustics, Speech and Signal Processing—ICASSP'07, Apr. 2007, pp. IV-33-IV-36, 4.

\* cited by examiner

TOPIC CORPUS 140a

Topic today is the pension plan for company employees...

REWRITING CORPUS 142a

Today let me talk about [uh] [medical] home {medical} care in Okinawa...

where [x] denotes deletion of X and {Y} denotes insertion of Y

ORIGINAL TRANSCRIPTION 142b

Today let me talk about uh medical home care in Okinawa...

REWRITTEN TRANSCRIPTION 142c

Today let me talk about home medical care in Okinawa...

GENERATED TEXT 148a

Today we {will} ask [uh] you [you] {questions} about the pension plan...

GENERATED TEXT AFTER REWRITING RULE APPLICATION 150a

Today we ask uh you you about the pension plan...

FIG. 3

TOPIC CORPUS 140a kokode no wadai ha kaisyain no nenkinjijo ni tsuite desu
ここでの話題は会社員の年金事情についてです...

REWRITING CORPUS 142a kyou ha okinawa no ken miyakojima no zaitakuiryou no hanashi wo ukagau ukagai
今日は沖縄[の]{県}宮古島 の 在宅医療の 話 を[伺う]{伺い}
　　ndesuga　　masu
[んですが]{ます} where [x] denotes deletion of X and {Y} denotes insertion of Y

ORIGINAL TRANSCRIPTION 142b kyou ha okinawa no miyakojima no zaitakuiryou no hanashi wo ukagau ndesuga
今日は 沖縄 の宮古島 の 在宅医療の 話 を伺うんですが...

REWRITTEN TRANSCRIPTION 142c kyou ha okinawaken miyakojima no zaitakuiryou no hanashi wo ukagai masu
今日は 沖縄県 宮古島 の 在宅医療の 話 を 伺います...

GENERATED TEXT 148a honzitsu ha okinawaken ni sumu kaisyain no nenkin ni tsuite ohanashi wo okiki
本日[は]沖縄県[に]{住む}会社員 の 年金についてお話{を}お聞き
　　surun　　desu　　shimasu
[するん]です{します}

GENERATED TEXT AFTER REWRITING RULE APPLICATION 150a honzitsu okinawaken kaisyain no nenkin ni tsuite ohanashi okiki surundesu
本日 沖縄県 会社員の年金について お話 お聞きするんです

FIG. 4

GENERATION OF MATCHED CORPUS FOR LANGUAGE MODEL TRAINING

BACKGROUND

The present disclosure, generally, relates to technique of preparing training data, more specifically to, technique for generating a text used for language model training.

To create a custom language model for speech recognition, there is a need for a sufficient matched corpus in terms of a domain and a speaking style. Preferably the domain of the corpus is the same as the target domain. Preferably the speaking style of the corpus is suitable for natural speech in use cases such as presentation, informal, colloquial, etc.

Although texts on the target domain manually transcribed from speeches having suitable speaking style is preferable, preparing such manually transcribed text can be expensive. On the other hand, a large amount of text data on a domain of interest (e.g. money, housing, travel, etc.) can be available at existing resources (e.g., a list of frequently asked questions, a manual, a product specification, internal Websites, etc.). However, such text data are still in written language even if these texts are not formal documents such as newspaper and academic papers.

SUMMARY

According to an embodiment of the present invention, a computer-implemented method for generating a text is provided. The method includes obtaining a first text collection matched with a target domain and a second text collection including a plurality of samples, each of which describes rewriting between a first text and a second text that has a style different from the first text. The method also includes training a text generation model with the first text collection and the second text collection. The text generation model has, in a vocabulary, one or more operation tokens indicating rewriting. The method further includes outputting a plurality of texts obtained from the text generation model.

Computer systems and computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

FIG. 3 shows English sample texts of a topic corpus and a rewriting corpus used for training a text generation model and English sample texts generated from the text generation model before and after a rewriting rule application according to the exemplary embodiment of the present invention;

FIG. 4 shows Japanese sample texts of a topic corpus and a rewriting corpus used for training a text generation model and Japanese sample texts generated from the text generation model before and after a rewriting rule application according to the exemplary embodiment of the present invention;

DETAILED DESCRIPTION

Now, the present invention will be described using particular embodiments, and the embodiments described hereafter are understood to be only referred to as examples and are not intended to limit the scope of the present invention.

One or more embodiments according to the present invention are directed to computer-implemented methods, computer systems and computer program products for generating a text used for language model training of, for example, a neural network or machine learning system based on a novel text generation technique, in which a text generation model of a neural network is trained with a given first text collection for domain matching and a given second text collection for style matching is used to generate texts for the language model training.

Hereinafter, first referring to FIGS. 1-4, a computer system for generating a matched corpus used for training a neural network language model for speech recognition based on a novel text generation technique according to an exemplary embodiment of the present invention will be described. Then, referring to FIG. 5, a computer-implemented method for generating a matched corpus used for training a language model for speech recognition based on a text generation technique according to an exemplary embodiment of the present invention will be described. Finally, referring to FIG. 6, a hardware configuration of a computer system according to one or more embodiments of the present invention will be described.

Figure 1:
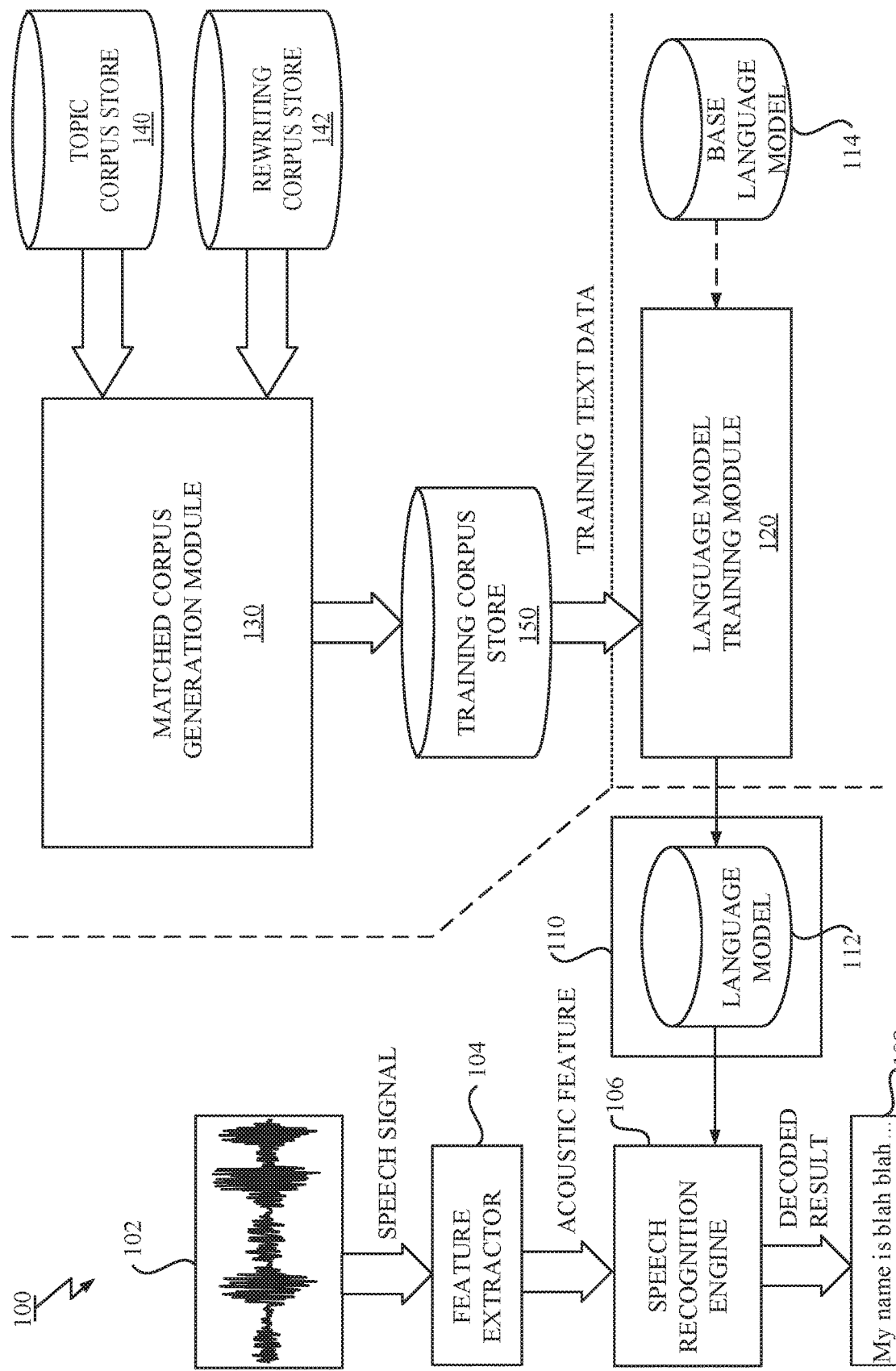
FIG. 1 illustrates a block diagram of a speech recognition system including a matched corpus generation module for generating texts used for language model training according to an exemplary embodiment of the present invention.

Referring to FIG. 1, a block diagram of a speech recognition system 100 that includes a matched corpus generation module 130 according to an exemplary embodiment of the present invention is described. The speech recognition system 100 can be implemented as, for example, a neural network or machine learning system.

As shown in FIG. 1, the speech recognition system 100 can include a feature extractor 104 for extracting acoustic features from an input; a speech recognition engine 106 for performing speech recognition for the input based on a speech recognition model 110; a language model training module 120 for training a language model 112 that constitutes the speech recognition model 110; and a training corpus store 150 for storing a collection of texts that are used for language model training performed by the language model training module 120. The speech recognition system 100 according to the exemplary embodiment of the present invention includes further the matched corpus generation module 130 for generating texts that match a target domain and a target speaking style and are preferably used for training the language model 112 for speech recognition. The generated texts would be stored into the training corpus store 150.

The feature extractor 104 can receive, as an input, audio signal data 102 digitalized by sampling audio signal, which can be input from a microphone for instance, at a predetermined sampling frequency and predetermined bit depth. In some embodiments the feature extractor 104 can also receive the audio signal data 102 from a remote client device through a network such as the internet. The feature extractor 104 is configured to extract acoustic features from the received audio signal data 102 by any known acoustic feature analysis to generate a sequence of the extracted acoustic features.

The acoustic features can include, but is not limited to, MFCC (Mel Frequency Cepstral Coefficient), LPC (Linear Predictive Coding) Coefficient, PLP (Perceptual Liner Prediction) Cepstral Coefficient, log Mel spectrum, or any combinations thereof. The acoustic features can further include dynamic acoustic features such as delta features and delta-delta features of the aforementioned (static) acoustic features. Note that elements of the acoustic feature sequence are called as "frames" while the audio signal data 102 includes a series of sampled values of the audio signal. Each frame holds a vector representing acoustic features.

The speech recognition engine 106 is configured to convert from the input sequence of the extracted acoustic features into a text, e.g., a sequence of words. The speech recognition engine 106 predicts most plausible speech contents for the input sequence of the extracted acoustic features based on the speech recognition model 110 and outputs a decoded result 108.

As illustrated in FIG. 1, the speech recognition model 110 includes the language model 112. The language model 112 is a model representing probability distribution of a word sequence and can be, but is not limited to, an n-gram model or a neural network-based model such as RNN (Recurrent Neural Network), LSTM (Long Short Term Memory). In the described embodiment, the unit of the language model 112 is a word. However, in other embodiment, the unit of the language model 112 can be a word, a phoneme, a syllable or a letter. The language model 112 is a target of training process performed by the language model training module 120. When the language model 112 is used in a production environment, for example, the language model 112 can, in some embodiments, have a lightweight architecture such as an n-gram language model in terms of computational cost and performance.

Although omitted in FIG. 1, the speech recognition model 110 can include an acoustic model, which is a model representing a relationship between input acoustic features and linguistic units that constitutes a speech or utterance. The acoustic model can be, but is not limited to, a GMM (Gaussian Mixture Model)/HMM (Hidden Markov Model) or an artificial neural network based acoustic model such as a hybrid DNN (Deep Neural Network)-HMM. In some embodiments, the speech recognition model 110 can include a dictionary providing relationships between the units of the language model 112 (e.g. word) and the unit of the acoustic model (e.g. phoneme or phone).

The speech recognition engine 106 finds a word sequence with a maximum likelihood by using the speech recognition model 110 (including the language model 112) based on the input sequence of the acoustic features, and outputs the word sequence as the decoded result 108. In other embodiments, the speech recognition engine 106 can be configured to find a word sequence exceeding a likelihood threshold, where the likelihood threshold can be a predefined value or set at runtime, as for example, by an operator.

The language model training module 120 is configured to perform a training process using a given corpus to obtain the language model 112. In a particular embodiment, the language model training module 120 can perform a modification that modifies a base language model 114 to the given corpus to obtain the language model 112. Note that, in some embodiments, the base language model 114 is a language model that has been trained with a huge amount of training texts that are collected from a variety of domains. Alternatively, the language model training module 120 can train the language model 112 with the given corpus and other available corpus from scratch.

In some embodiments, preparing a sufficient matched training corpus is preferable to creating a custom language model for speech recognition. Here, the meaning of the term "matched" has two aspects: a domain and a style. Preferably the domain (or topic) of the texts is the same as a target domain (or topic). Preferably the speaking style is suitable for natural speech in use cases such as presentation, informal, colloquial, etc.

When speech recognition on a housing domain is targeted, texts extracted from documents relating to a housing topic or field can be preferably prepared. When colloquial style speech is targeted, texts having the colloquial style can be preferably prepared.

The best resource can be a collection of texts on the target domain that are manually transcribed from speeches having a target speaking style. However, preparing such manually transcribed texts is labor-intensive and expensive. On the other hand, texts on the target topics can be found at existing resources (e.g., a list of frequently asked questions, a manual of a service or product, a specification of a service or product, internal Websites, etc.). However, such texts may still be in a written language even if these texts are not formal documents such as newspaper and academic papers, for example.

In order to prepare a corpus sufficiently matched with the target domain and the target style, the matched corpus generation module 130 can be configured, in some embodiments, to generate texts based on plural types of corpora including a corpus for domain matching (hereinafter, referred to as a topic corpus) and a corpus for style matching (hereinafter, referred to as a rewriting corpus). The topic corpus and the rewriting corpus are stored in a topic corpus store 140 and a rewriting corpus store 142, respectively.

Figure 2:
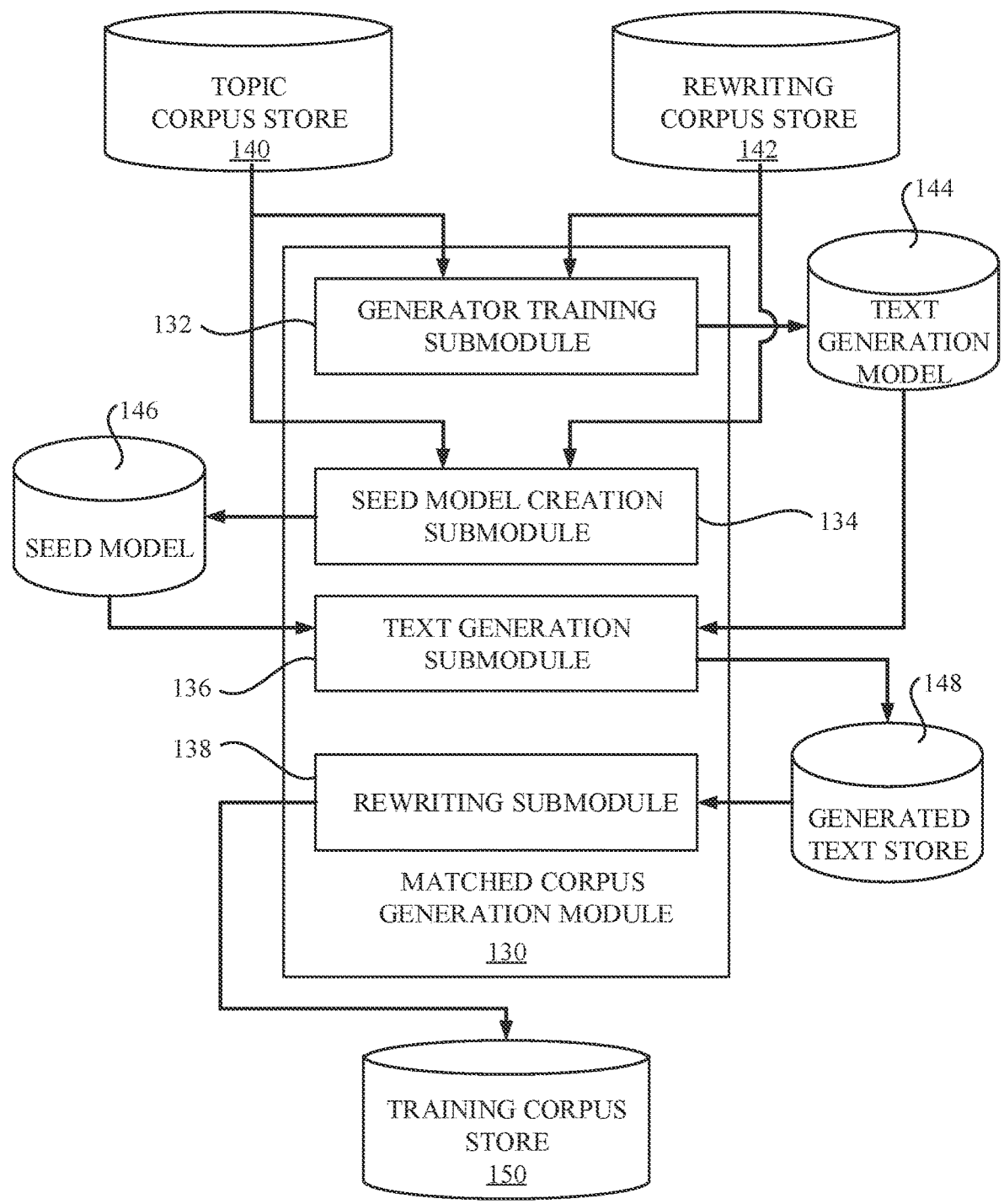
FIG. 2 shows a detailed block diagram of the matched corpus generation module according to the exemplary embodiment of the present invention.

Referring to FIG. 2, a detailed block diagram of an embodiment of the matched corpus generation module 130, shown in FIG. 1, is described. In FIG. 2, there is a plurality of stores for storing corresponding corpora, including the topic corpus store 140, the rewriting corpus store 142 and the training corpus store 150.

As shown in FIG. 2, the matched corpus generation module 130 includes a generator training submodule 132 for training a text generation model (or a generator) 144 for text generation using the topic corpus and the rewriting corpus stored in the stores 140, 142, respectively; a seed model creation submodule 134 for creating a seed model 146 for the text generation using the topic corpus and the rewriting corpus stored in the stores 140, 142, respectively; a text generation submodule 136 for generating a plurality of texts, which are stored in the generated text store 148, using the text generation model 144 and the seed model 146; and a rewriting submodule 138 for applying a rewriting rule to the texts generated by the text generation submodule 136 to obtain final texts used for the language model training (e.g., training corpus store 150).

The matched corpus generation module 130 is configured to obtain the topic corpus and the rewriting corpus stored in the topic corpus store 140 and the rewriting corpus store 142, respectively.

The topic corpus stored in the topic corpus store 140 can be a collection of texts that match the target domain. Note that the target domain means a topic and/or a field of speech contents to which the speech recognition is targeted. If a sentence of a text matches one of topics or fields related to the target domain, the text is said to match the target domain. The inclusion of sentences unrelated to the target domain is not precluded. However, a larger number of sentences relevant to the topic and/or field is more preferable. Also, a larger size of the topic corpus is more preferable.

For example, when the speech recognition model 110, shown in FIG. 1, is customized for home builders, texts extracted from documents relating to housing, construction, building materials, etc. can be prepared. When the speech recognition model 110 is customized for travel agencies, texts extracted from documents relating to tourist attractions, local cultures, transportations, etc. can be prepared.

The texts in the topic corpus can include a sentence in written language or spoken language. For example, in some embodiments, texts in a form of questions and answers can be preferably prepared. Note that even though the texts in the form of questions and answers include conversational sentences, these texts are still in a written language and are different from actual spontaneous speeches that generally include fillers, speech errors, false starts, stutters, repetitions, etc. FIG. 3 and FIG. 4 show English and Japanese sample texts of the topic corpus 140a, respectively.

The rewriting corpus stored in the rewriting corpus store 142 is a collection of samples, each of which describes rewriting between an original text and a rewritten text having a style different from that of the original text. In the described embodiment, the original text has a target style that is a spontaneous style in the particular embodiment. The style of the rewritten text is preferably a style at least similar to the style of the topic corpus stored in the topic corpus store 140 and is more formatted style than the original text in the particular embodiment. The rewriting corpus is a kind of a parallel corpus that includes pairs of an original transcript and a rewritten one that is modified from the original transcript to have a style more similar to the topic corpus than the target style of the original transcription. When the topic corpus includes the texts of the questions and answers type that includes conversational sentences but has a more formatted style than the actual spontaneous style, a rewritten transcription is modified from the original transcript to have more formatted style for better readability for human. When the topic corpus includes text having a more rigid (or bookish) style, a rewritten one is modified from the original transcript to have a more rigid style beyond improvement of readability for human. Preferably the original texts for the rewriting corpus are collected from a wide variety of domains. Note that one rewriting corpus can be shared with different topic corpora for the purpose of respective customizations. For example, one rewriting corpus can be used commonly for a topic corpus collected for home builders and other topic corpus collected for travel agencies.

FIG. 3 and FIG. 4 show English and Japanese sample texts of the rewriting corpus 142a, respectively. As shown in FIG. 3 and FIG. 4, the text of the rewriting corpus 140a describes rewriting from an original transcription 142b having a spontaneous style to a rewritten transcription 142c having a more formatted style than that of the original transcription 142b. The text of the rewriting corpus 140a shown in FIG. 3 and FIG. 4 includes one or more operation tokens that indicate rewriting. Such operation tokens include a deletion token [X] indicating deletion of a text part X and a insertion token {Y} indicating insertion of a text part Y where text parts X and Y denote words, phrases, etc., independently. In FIG. 3, tokens [uh] and [medical] denote deletion of a filler "un" and a word "medial". The token {medical} denotes insertion of a word "medical".

The texts in the rewriting corpus can be manually created by human experts. The human expert can annotate the original texts with operation tokens while adding words and/or phrases and deleting words and/or phrases to rewrite an original sentence having a spontaneous style into a rewritten sentence having a more formatted style. In the described embodiment, the style of the original transcription, e.g., the spontaneous style, is the target style suitable for the use cases.

In the described embodiment, the direction of the rewriting is a direction from a spontaneous style to more formatted style. It is preferable since a task of rewriting a spontaneous style sentence into a more a formatted style sentence is easier for the human experts in comparison with a task of rewriting a formatted style sentence into a more colloquial style sentence. Generally, transcribing is conducted under a given transcription rule. A clean or non-verbatim transcription is obtained from a true, strict or simply verbatim transcription that is transcribed exactly and includes all of speaker's utterances including fillers, speech errors, false starts, stutters, repetitions, and the like after post-processing such as removal of filler, correction of speech errors and false starts, and the like. Thus, a pair of a clean verbatim transcription and true verbatim transcription can be used for the rewriting corpus. However, the direction of the rewriting is not limited and a direction from a formatted style to a more colloquial style can also be contemplated.

In the described embodiment, the text sample of the rewriting corpus are prepared in a reduced form 142a with the insertion and/or deletion tokens (e.g., [X], {Y}) that represents both of the original and rewritten transcriptions 142b, 142c. However, in other embodiment, the text of the rewriting corpus is prepared in a form of a pair of the original and rewritten transcriptions 142b, 142c as long as the original and rewritten transcriptions 142b, 142c are converted into the reduced form 142a before the subsequent process by the generator training submodule 132 for each sample. The conversion to the reduced form 142a can be done by computing correspondence between the original and rewritten transcriptions using an appropriate method such as DP (Dynamic Programming) matching and by inserting operational tokens so as to change the original transcription into the rewriting transcription with the minimum number of editing operations.

The generator training submodule 132 is configured to train a language model with the texts of the topic corpus and the rewriting corpus stored in the stores 140, 142 to obtain the text generation model 144. The generator training submodule 132 can feed the texts in the topic corpus and the texts in the rewriting corpus into the text generation model 144 during the training process. A way of feeding the texts is not limited. The generator training submodule 132 can feed the texts in the topic corpus and the texts in the rewriting corpus sequentially, alternately or randomly as a part or as a whole.

The text generation model 144 is the language model. However, unlike conventional language models, the text generation model 144 has, in their vocabulary, special tokens, including the deletion and insertion tokens of specific text parts. Generally, the number of the tokens in the text generation model 144 increases since the text generation model 144 can have plural tokens relating to the same text part X, which can include X, [X] and {X}. Note that the text generation model 144 can have more complexity than the language model 112 that is trained with the plurality of the generated texts by the matched corpus generation module 130 and used for speech recognition in production environment. Training of the language model can be conducted by an appropriate algorithm.

Preferably a complex language model that can handle longer contexts than the language model 112 is employed. In a particular embodiment, when an n-gram language model is employed as the language model 112, a RNN (Recurrent Neural Network)-type (including basic RNN, LSTM, etc.) language model is employed as the text generation model 144. The RNN type language model can be trained by a BPTT (Back-Propagation Through Time) algorithm. The parameters of the resultant text generation model 144 are stored into any internal or external storage device or medium.

The seed model creation submodule 134 is configured to create the seed model 146 using the topic corpus and the rewriting corpus stored in the stores 140, 142. Note that the seed model 146 created by the seed model creation submodule 134 is used for seed generation in the text generation process by the text generation model 144.

The seed model creation submodule 134 first trains a first seed model base and a second seed model base using the topic corpus and the rewriting corpus, respectively. The first seed model base trained using the topic corpus is referred to as a topic seed base (T) whereas the second seed model base trained using the rewriting corpus is referred to as a rewriting seed base (R). Both the topic seed base (T) and the rewriting seed base (R) are language models. In a particular embodiment, the topic seed base (T) and the rewriting seed base (R) are simply unigram (1-gram) language models that give probability for each token.

After completion of creation of the topic and rewriting seed bases (T, R), the seed model creation submodule 134 then performs an interpolation of the topic seed base (T) and the rewriting seed base (R) to create the seed model 146. The created seed model 146 is used for text generation in conjunction with the text generation model 144.

The interpolation is preferably a non-linear interpolation. The non-linear interpolation includes a plurality of conditions for giving weights for mixing the seed bases (T, R). In a particular embodiment, the non-linear interpolation includes a condition giving priority to the rewriting seed base (R) for filler and operation tokens and one or more other conditions giving priority to the topic model base (T) or the rewriting model base (R) in a manner depending on respective probabilities for word tokens. The non-linear interpolation is different from a linear interpolation where weights of mixing of multiple seed bases are fixed for all tokens (e.g., weights for all the tokens are fixed to 0.5).

An example of the non-linear interpolation is described as follow:

$$P(w_i) = \lambda(w_i)P_R(w_i) + (1 - \lambda(w_i))P_T(w_i),$$

$$\lambda(w_i) = \begin{cases} 1.0, \text{ if } w_i \in \{\text{filler}, [X], \{Y\}\} \\ 0.8, \text{ if } P_R(w_i) < P_T(w_i) \\ 0.x, \text{ if } P_R(w_i) \geq P_T(w_i) \\ \cdots \end{cases},$$

Normalize $(P(w_i))$ where $w_i$ denotes a token having an index i, $P(w_i)$ denotes a probability of the token $w_i$ for the seed model 144, $P_T(w_i)$ and $P_R(w_i)$ denote probabilities of the token $w_i$ for the topic seed base (T) and the rewriting seed base (R), and $\lambda(w_i)$ is a weight for mixing the topic seed base (T) and the rewriting seed base (R) with respect to the token $w_i$.

Ideally, words in the seed model 146 are classified into content words (cw) and function words (fw). The probabilities for the content words (cw) preferably are derived from the topic seed base (T) with priority since the content words (cw) are considered to describe topics or fields of the texts better. The probabilities for the function words (fw) are preferably derived from the rewriting seed base (R) with priority since the function words (fw) are considered to represent a style of texts better. The aforementioned non-linear interpolation rule well approximates such tendency without using linguistics knowledge such as PoS (Part of Speech) information. However, in other embodiment, alternative rules can also be contemplated. Although the aforementioned non-linear interpolation rule has an advantage of not requiring the linguistics knowledge such as PoS (Part of Speech) information, use of PoS (Part of Speech) information is not hindered.

The parameters of the resultant seed model 146 are stored into any internal or external storage device or medium.

After completion of training of the text generation model 144 and the creation of the seed model 146, the text generation submodule 136 is configured to generate a plurality of texts using the trained text generation model 144 and the created seed model 146. The texts generated by the text generation submodule 136 are stored in a generated text store 148, which can be provided by using any internal or external storage device or medium.

In a particular embodiment, the text generation submodule 136 selects a seed based on occurrence probability of each token using the seed model 146 and feeds the seed into the text generation model 144 to obtain a prediction, e.g., a probability distribution over tokens. The text generation submodule 136 repeats feeding of a token based on the output of the text generation model 144 (e.g., a token having a highest probability, a token selected according to the probability distribution) and obtaining of a prediction from the text generation model 144 within an predetermined upper limit number of times until the end of the sentence (EOS) appears. The texts are generated in this manner.

The texts just generated by the text generation submodule 136 are tagged texts that can include one or more operation tokens such as the deletion tokens and the insertion tokens. FIG. 3 and FIG. 4 show English and Japanese sample texts 148a just generated from the text generation model 144 with the seed model 146, respectively. In FIG. 3, the generated text 148a includes deletion tokens [uh] and [you] and insertion tokens {will} and {questions}.

The rewriting submodule 138 is configured to apply a rewriting rule to the plurality of the tagged texts generated by the text generation submodule 136 to obtain a plurality of untagged texts. The rewriting rule applied to the tagged texts is an inverse rewriting rule with respect to the rewriting rule applied to the rewriting corpus since the rewriting rule applied to the rewriting corpus is defined in a direction of rewriting from the original transcription 142b having the target style to the rewritten transcription 142c having more formatted style. The deletion token [X] in the rewriting rule applied to the rewriting corpus indicates insertion of a text part X in the inverse rewriting rule. The insertion token {Y} in the rewriting rule applied to the rewriting corpus indicates deletion of a text pat Y in the inverse rewriting rule.

FIG. 3 and FIG. 4 show English and Japanese sample texts 150*a* generated from the text generation model 144 after the rewriting rule application, respectively. As apparent when comparing the generated text before the rewriting rule application 148*a* and the generated text after the rewriting rule application 150*a* in FIG. 3 and FIG. 4, the tagged texts is untagged so that a text part between curly brackets ({..}) are deleted together with the curly brackets and a text part between square brackets ([..]) are converted to a form without square brackets. In FIG. 3, the generated text 150*a* includes text parts "uh" and "you" and does not include text parts "{will}" and "{questions}" that are originally included in the generated text 148*a* before the rewriting rule application.

The matched corpus generation module 130 is configured to output the generated texts after the rewriting rule application as training texts for the language model 112. An amount of the generated texts can be controlled by the number of repetition times of the text generation and is preferably larger than a total amount of the topic corpus and the rewriting corpus used to train the text generation model 144. The generated texts are stored into the training corpus store 150, which can be provided by using any internal or external storage device or medium. The generated texts constitute a training corpus that is expected to be well matched with the target domain and the target style.

Referring back to FIG. 1, the language model training module 120 performs the training process using the training corpus stored in the training corpus store 150, including the texts generated by the matched corpus generation module 130, to obtain the language model 112. The language model training module 120 can perform modifications that modify one or more already trained language models to the target domain and the target style using the given training corpus. Alternatively, the language model training module 120 can train the language model 112 using at least the training corpus stored in the training corpus store 150 from scratch. The language model 112 has preferably more lightweight architecture than that of the text generation model 144. In a particular embodiment where the text generation model 144 is a RNN based language model, an n-gram language model is employed as the language model 112.

In a particular embodiment where the modification is performed, the plurality of the generated texts stored in the training corpus store 150 is used for training the language model 112 in conjunction with at least one of (i) a base language model 114 that has been already trained with a corpus that is collected from a wide variety of domains and has a size larger than total of the topic and rewriting corpora, (ii) a first language model trained with the topic corpus and (iii) a second language model trained with the rewriting corpus (e.g., transcriptions with the target speaking style). The modification of the language model can be conducted by appropriate method. In a particular embodiment where the language model 112 is an n-gram language model, mixing a plurality of language models with customization weights can be performed. The appropriate customization weight for each language model can be specified by an operator or automatically optimized.

Note that the second language model trained using the rewriting corpus (e.g., transcriptions with the target speaking style) is preferably used for the modification. However, even if the second language model trained using the rewriting corpus is not used, it is possible that positive contribution of the second language model to the language model 112 is compensated by increasing the amount of the generated texts used for the modification. There is a practical demand for using merely the generated texts but not the rewriting corpus at the training site of the language model 112. Increasing the amount of the generated texts used for training contributes to accuracy improvement.

In particular embodiments, each of modules 104, 106, 120 and 130 described in FIG. 1 and each of submodules 132, 134, 136 and 138 of the matched corpus generation module 130 described in FIG. 2 can be, but not limited to, implemented as a software module including program instructions and/or data structures in conjunction with hardware components such as a processor device, a memory, etc.; as a hardware module including electronic circuitry; or as a combination thereof. These modules 104, 106, 120 and 130 shown in FIG. 1 and submodule 132, 134, 136 and 138 shown in FIG. 2 can be implemented on a single computer device such as a personal computer and a server machine or over a plurality of devices in a distributed manner such as a computer cluster of computer devices, client-server systems, and edge computing systems, cloud computing systems, etc. The corpus stores 140, 142 150 and the generated text store 148 can be provided by using any internal or external storage device or medium, to which the processing circuity of the computer system implementing the matched corpus generation module 130 is operatively coupled. The parameters of the text generation model 144 and the seed model 146 can be stored any internal or external storage device or medium, to which the processing circuity of the computer system implementing the matched corpus generation module 130 is operatively coupled.

In FIG. 1, examples of boundaries between plural computer systems in the case where these modules 104, 106, 120 and 130 shown in FIG. 1 and sub-module 132, 134, 136 and 138 shown in FIG. 2 are implemented over a plurality of computer systems are also illustrated by a dashed and a dot lines.

In a particular embodiment, as indicated by the dashed line in FIG. 1, the feature extractor 104, the speech recognition engine 106 and the speech recognition model 110 including the language model 112 that is trained by the language model training module 120 are implemented on a computer system of a user side while the matched corpus generation module 130 and the language model training module 120 are implemented on a computer system of a provider side of speech recognition system. In a further variant embodiment, merely the feature extractor 104 is implemented on the user side and the speech recognition engine 106 and the speech recognition model 110 are implemented on the provider side. In this embodiment, the computer system of the client side merely transmits the sequence of the acoustic features to the computer system of the provider side and receives the decoded result 108 from the provider side. In other variant embodiment, the feature extractor 104, the speech recognition engine 106 and the speech recognition model 110 are all implemented on the provider side and the computer system of the client side merely transmits the audio signal data 102 to the computer system of the provider side and receives the decoded result 108 from the provider side.

In other embodiments, the aforementioned components described to be implemented on the provider side of the speech recognition system (120, 130) can be further distributed onto different computer systems. In a particular embodiment, the matched corpus generation module 130 is merely implemented on a provider side of the training corpus. The matched corpus generation module 130 generates training corpus based on given corpora and provides the training corpus to the provider sides of the speech recognition system where the language model 112 is trained by the language model training module 120 using a given training corpus.

Note that in the described embodiment, the speech recognition system 100 is described as a model having traditional architecture, in which the acoustic model and the language model that are built separately are used hierarchically. However, recently, end-to-end models that jointly learn the traditional components of the speech recognition system including the acoustic model and the language model at least in part have been developed. Although an end-to-end model that handles word unit (acoustic-to-word model) is known, there is also other type of the end-to-end model that handles a sub-word (e.g. phone) unit and requires still a language model. The training corpus generated by the matched corpus generation module 130 can be used to train such language model that is applied after the end-to-end model.

Hereinafter, referring to FIG. 5, a flowchart depicting a process for generating texts for language model training according to an exemplary embodiment of the present invention is described. Note that the process shown in FIG. 5 can be performed by processing circuitry such as a processing unit of a computer system that implements the matched corpus generation module 130 shown in FIG. 1 and the sub-modules shown in FIG. 2.

Figure 5:
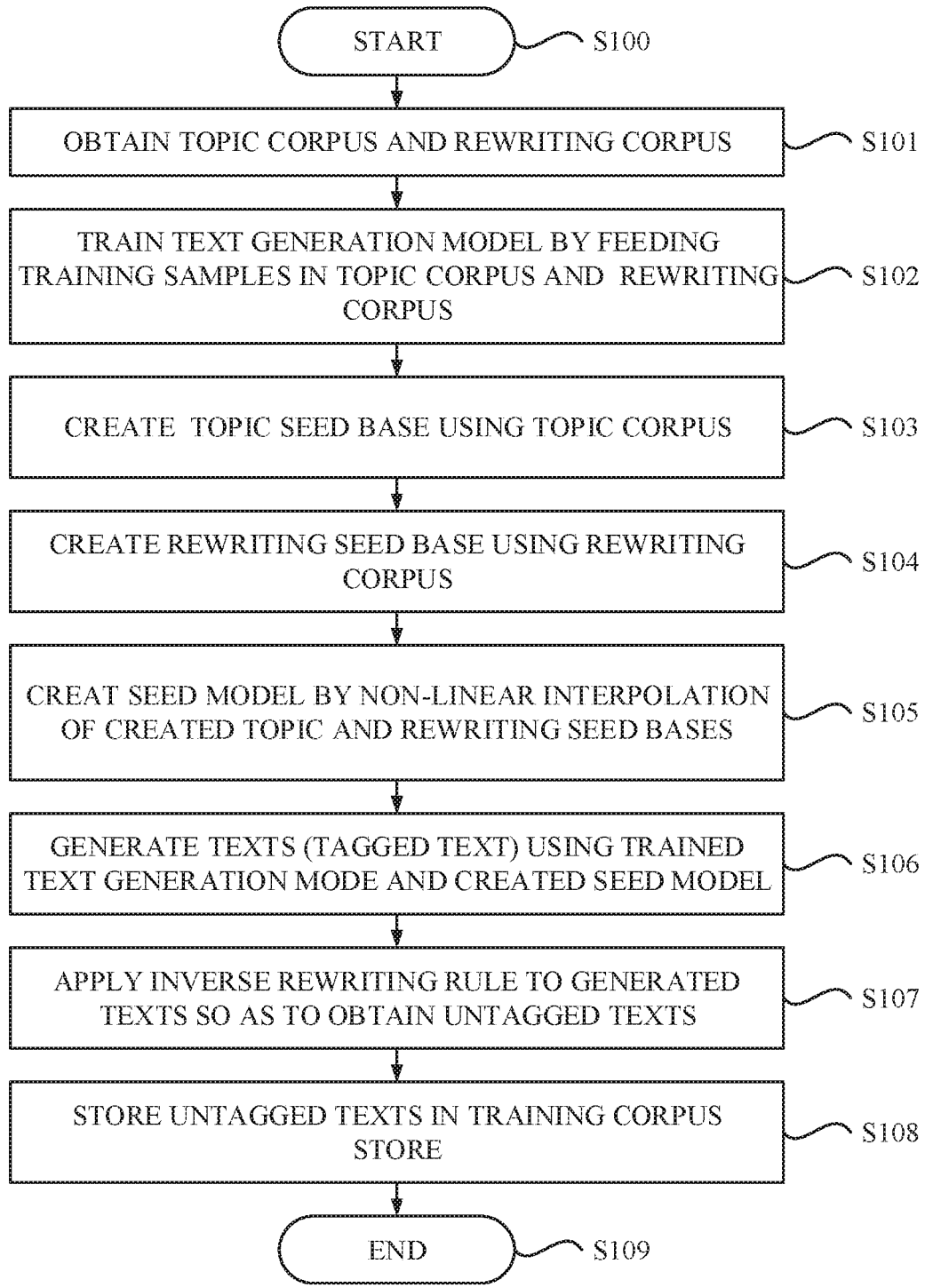
FIG. 5 is a flowchart depicting a process for generating texts used for language model training according to an exemplary embodiment of the present invention.

The process shown in FIG. 5 can begin at block S100 in response to receiving a request for matched corpus generation from an operator, for example. The process shown in FIG. 5 is conducted for the given corpora, which can be designated in the request.

At block S101, the processing unit can obtain, by the matched corpus generation module 130, a topic corpus and a rewriting corpus in the topic and rewriting corpus stores 140, 142. The topic corpus is a collection of texts that matches a target domain. The rewriting corpus is a collection of samples, each of which represents rewriting from an original transcription to a rewritten transcription having a style different from the original transcription. In the described embodiment, the original transcription has a speaking style that matches the target speaking style and is a spontaneous style in the particular embodiment. The style of the rewritten text is preferably a style at least similar to the style of the topic corpus stored in the topic corpus store 140 and is more formatted style than the original text in the particular embodiment.

At block S102, the processing unit can train, by the generator training submodule 132, a language model as a text generation model 144 by feeding training samples in the topic corpus and the rewriting corpus. The texts in the topic corpus and the texts in the rewriting corpus are fed into the text generation model 144 in an appropriate manner. The text generation model 144 has one or more operation tokens in its vocabulary. The operation tokens include insertion tokens, each of which indicates insertion of a text part, and/or deletion tokens, each of which indicates deletion of a text part. The text generation model 144 has more complexity than the language model 112 to be trained for speech recognition.

At block S103, the processing unit can create a first language model as a topic seed base (T) using the topic corpus. At block S104, the processing unit can create a second language model as a rewriting seed base (R) using the rewriting corpus. At block S105, the processing unit can create, by the seed model creation submodule 134, a seed model 146 by a non-linear interpolation of the topic and rewriting seed bases (T, R) created at blocks S103 and S104.

The nonlinear interpolation can include a condition giving priority to the rewriting seed base (R) for filler and operation tokens and a condition giving priority to the topic seed base (T) or the rewriting seed base (R) depending on probabilities for word tokens. The created seed model 146 is used for text generation in conjunction with the text generation model 144.

At block S106, the processing unit can generate, by the text generation submodule 136, texts using the text generation model 144 trained at block S102 and the seed model 146 created at block S105. The generated text can be a tagged text that has the operation token such as [X], {Y}.

At block S107, the processing unit can apply, by the rewriting submodule 138, an inverse rewriting rule with respect to the rewriting corpus to the generated texts so as to obtain untagged texts.

At block S108, the processing unit can output, by the matched corpus generation module 130, the obtained untagged texts to the training corpus store 150, and the process can ends at block S109. The amount of the plurality of the generated texts is larger than a total amount of the topic corpus and the rewriting corpus.

After completion of the process shown in FIG. 5 the plurality of the obtained texts is used for training the language model 112 solely or in conjunction with other corpus and/or one or more already trained language models.

According to the aforementioned embodiments, by generating texts from a given plural types of corpora, including a topic corpus for domain matching and a rewriting corpus for style matching, the performance of the speech recognition using the language model that has been trained using the generated texts is improved without any harmful side effect.

Especially, speaking styles that are often observed in informal, casual and/or spontaneous conversations, presentations or utterances are preferably targeted. Also, it is especially effective in cases where merely a small amount of corpus is available.

In a particular embodiment where the texts are prepared for modification of the base language model, the obtained language model is expected to have improved accuracy for the speeches of the target domain than the base language model. Also, the accuracy of the speech recognition can be improved by increasing the amount of the texts generated by the novel text generation technique according to the aforementioned embodiments.

One of potential approaches to obtain matched corpus is to convert original texts into more colloquial style with fillers, missing and/or redundant function words, which are usually found in natural speech. However, the conversion generally requires PoS information and it is still difficult to convert the text on any topic to a spontaneous speech style. In contrast to the conversion approach, the novel text generation techniques generate matched corpus by training a text generation model using a topic corpus and a rewriting corpus describing rewriting between original transcriptions and rewritten transcriptions having different styles. The novel text generation techniques also outperform simple text generation techniques where a text generation model trained with a topic corpus and a corpus of transcriptions with a target speaking style but not matched domain is used for text generation. Note that the simple text generation technique using the corpus of the transcriptions with the target speaking style degrades the performance of the speech recognition on the target domain since the simple text generation technique is considered to fail to obtain texts corresponding to a mixed portion of topic words and style words.

Note that the languages, to which the novel text generation technique, according to the embodiments of the invention, are applicable, are not limited and such languages can include, but are by no means limited to, Arabic, Chinese, English, French, German, Japanese, Korean, Portuguese, Russian, Swedish, Spanish, for example.

Also the language model to which training with texts generated by the novel text generation technique is applicable is not limited to the language model for speech recognition and the language model can be used, in some embodiments, for other tasks, such as, for example, machine translation, optical character recognition, handwriting recognition, and so on.

Although the advantages obtained with respect to the one or more specific embodiments according to the present invention have been described, it should be understood that some embodiments may not have these potential advantages, and these potential advantages are not necessarily required of all embodiments.

Figure 6:
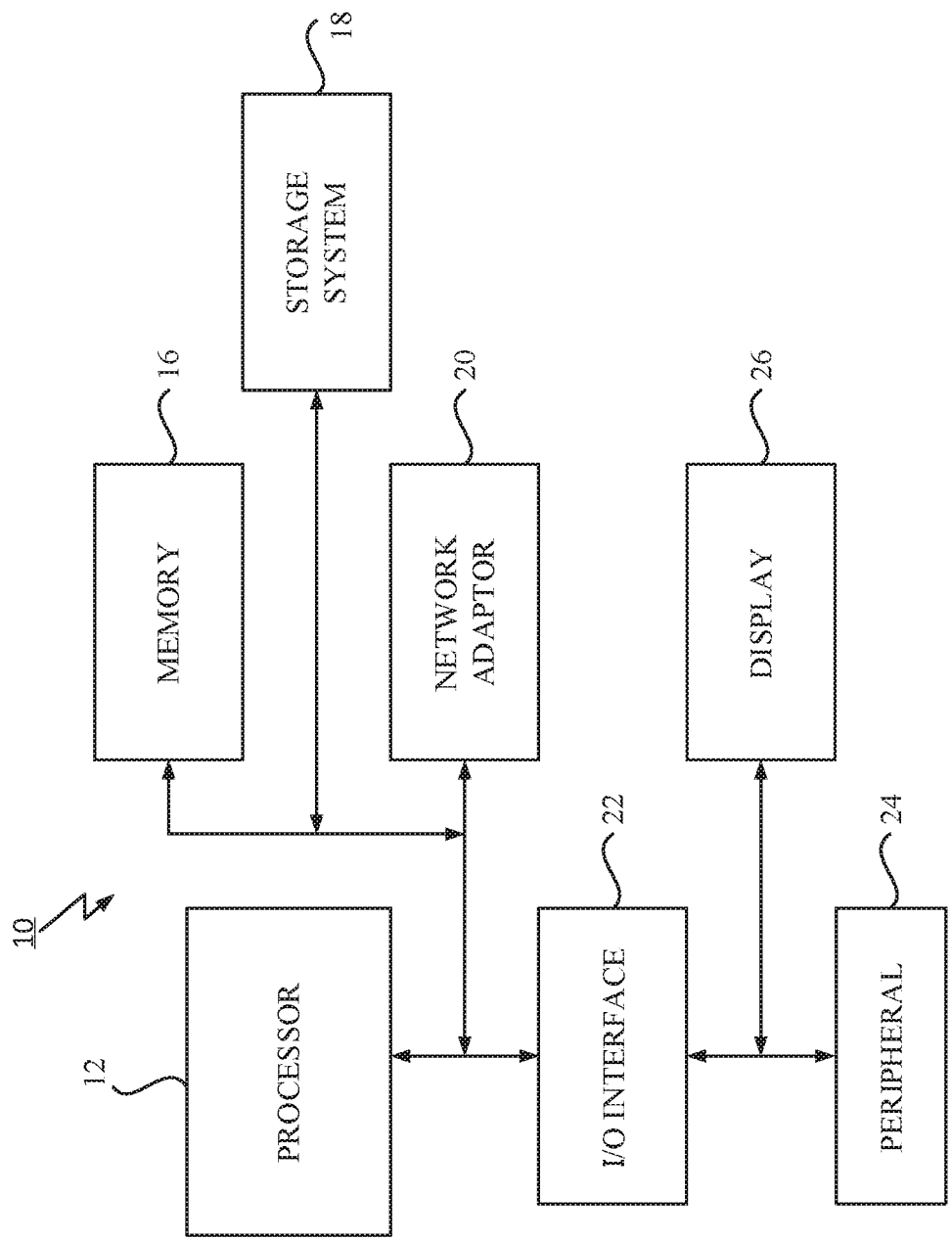
FIG. 6 depicts a schematic of a computer system according to one or more embodiments of the present invention.

Referring now to FIG. 6, a schematic of an example of a computer system 10 is shown, which can be used for implementing the speech recognition system 100 or a module or a submodule of the speech recognition system 100 (shown in FIG. 1), for example. The computer system 10 shown in FIG. 6 is implemented as a computer system. The computer system 10 is only one example of a suitable processing device and is not intended to suggest any limitation as to the scope of use or functionality of embodiments of the invention described herein. Regardless, the computer system 10 is capable of implementing and/or performing any of the functionality set forth hereinabove.

The computer system 10 is operational with numerous other general purpose or special purpose computing system environments or configurations. Examples of well-known computing systems, environments, and/or configurations that can be suitable for use with the computer system 10 include, but are not limited to, personal computer systems, server computer systems, thin clients, thick clients, handheld or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 can be described in the general context of computer system-executable instructions, such as program modules, being executed by a computer system. Generally, program modules can include routines, programs, objects, components, logic, data structures, and so on that perform particular tasks or implement particular abstract data types.

As shown in FIG. 6, the computer system 10 is shown in the form of a general-purpose computing device configured as, for example, a learning machine such as a neural network or machine learning system, implementing embodiments of the present invention. The components of the computer system 10 can include, but are not limited to, a processor device (or processing unit) 12 and a memory 16 coupled to the processor device 12 by a bus including a memory bus or memory controller, and a processor or local bus using any of a variety of bus architectures.

The computer system 10, in some embodiments, includes a variety of computer system readable media. Such media can be any available media that is accessible by the computer system 10, and it includes both volatile and non-volatile media, removable and non-removable media.

The memory 16 can include computer system readable media in the form of volatile memory, such as random access memory (RAM). The computer system 10 can further include other removable/non-removable, volatile/non-volatile computer system storage media. By way of example only, the storage system 18 can be provided for reading from and writing to a non-removable, non-volatile magnetic media. As will be further depicted and described below, the storage system 18 can include at least one program product having a set (e.g., at least one) of program modules that are configured to carry out the functions of embodiments of the invention.

A program/utility, having a set (at least one) of program modules, can be stored in the storage system 18 by way of example, and not limitation, as well as an operating system, one or more application programs, other program modules, and program data. Each of the operating system, one or more application programs, other program modules, and program data or some combination thereof, can include an implementation of a networking environment. Program modules generally carry out the functions and/or methodologies of embodiments of the invention as described herein.

The computer system 10 can also communicate with one or more peripherals 24 such as a keyboard, a pointing device, a car navigation system, an audio system, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Still yet, the computer system 10 can communicate with one or more networks such as a local area network (LAN), a general wide area network (WAN), and/or a public network (e.g., the Internet) via the network adapter 20. As depicted, the network adapter 20 communicates with the other components of the computer system 10 via a bus. It should be understood that although not shown, other hardware and/or software components could be used in conjunction with the computer system 10. Examples, include, but are not limited to, microcode, device drivers, redundant processing units, external disk drive arrays, RAID systems, tape drives, and data archival storage systems, etc.

The present invention can be a computer system, a method, and/or a computer program product. The computer program product can include a computer readable storage medium (or media) having computer readable program instructions thereon for causing a processor device to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor device of a general purpose computer, special purpose computer, or other programmable data processing apparatus to produce a machine, such that the instructions, which execute via the processor device of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational blocks to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, blocks, operations, elements, and/or components, but do not preclude the presence or addition of one or more other features, integers, blocks, operations, elements, components and/or groups thereof.

The corresponding structures, materials, acts, and equivalents of all means or block plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating a text, the method comprising:

obtaining a first text collection matched with a target domain and a second text collection including a plurality of samples each describing rewriting between a first text and a second text having a style different from the first text;

training a text generation model of a learning machine with the first text collection and the second text collection, the text generation model having, in a vocabulary, one or more operation tokens indicating rewriting;

creating a seed model used for obtaining the plurality of texts in conjunction with the text generation model, the seed model created by a nonlinear interpolation of a first seed model base trained with the first text collection and a second seed model base trained with the second text collection, the nonlinear interpolation including a plurality of conditions for giving weights for mixing the first and second seed model bases; and outputting a plurality of texts obtained from the text generation model, the plurality of texts being configured for training a language model of a speech recognition engine.

2. The method of claim 1, wherein the one or more operation tokens includes one or more insertion tokens and/or one or more deletion tokens, each insertion token indicating insertion of a text part, each deletion token indicating deletion of a text part.

3. The method of claim 1, the method further comprising:
generating a plurality of tagged texts having at least one operation token using at least the text generation model; and
applying a rewriting rule to each tagged text to obtain a plurality of untagged texts as the plurality of the texts used for training a language model.

4. The method of claim 1, wherein the first seed model base is a topic seed base (T) and the second seed model base is a rewriting seed base (R).

5. The method of claim 4, wherein the topic seed base (T) and the rewriting seed base (R) are unigram language models that provide a probability for each token.

6. The method of claim 5, wherein the nonlinear interpolation includes a first condition giving priority to the second seed model base for filler and operation tokens and a second condition giving priority to the first seed model base or the second seed model base depending on probabilities for word tokens.

7. The method of claim 1, wherein the text generation model has more complexity than a language model to be trained with the plurality of texts.

8. The method of claim 1, wherein the plurality of texts is used for training a language model in conjunction with at least one of a base language model trained with a corpus other than the first text collection and second text collection, a first language model trained with the first text collection and a second language model trained with the second text collection.

9. The method of claim 1, wherein, the plurality of texts is used for training a language model and an amount of the plurality of texts is larger than a total amount of the first text collection and the second text collection.

10. The method of claim 1, wherein the first text has a spontaneous style and the style of the second text is a more formatted style than the first text.

11. A computer system for generating a text, by executing program instructions, the computer system comprising:
a memory storing the program instructions;
a processor device in communications with the memory for executing the program instructions, wherein the processing unit is configured to:
obtain a first text collection matched with a target domain and a second text collection including a plurality of samples each describing rewriting between a first text and a second text having a style different from the first text;
train a text generation model with the first text collection and the second text collection, wherein the text generation model has, in a vocabulary, one or more operation tokens indicating rewriting;
create a seed model used for obtaining the plurality of texts in conjunction with the text generation model, the seed model created by a nonlinear interpolation of a first seed model base trained with the first text collection and a second seed model base trained with the second text collection, the nonlinear interpolation including a plurality of conditions for giving weights for mixing the first and second seed model bases; and
output a plurality of texts obtained from the text generation model the plurality of texts being configured for training a language model of a speech recognition engine.

12. The computer system of claim 11, wherein the one or more operation tokens includes one or more insertion tokens and/or one or more deletion tokens, each insertion token indicating insertion of a text part, each deletion token indicating deletion of a text part.

13. The computer system of claim 11, wherein the processor device is further configured to:
generate a plurality of tagged texts having at least one operation token using at least the text generation model; and
apply a rewriting rule to each tagged text to obtain a plurality of untagged texts as the plurality of texts used for training a language model.

14. The computer system of claim 11, wherein the first seed model base is a topic seed base (T) and the second seed model base is a rewriting seed base (R).

15. The computer system of claim 14, wherein the topic seed base (T) and the rewriting seed base (R) are unigram language models that provide a probability for each token.

16. A computer program product for generating a text, the computer program product comprising a non-transitory computer readable storage medium having program instructions embodied therewith, the program instructions executable by a computer to cause the computer to perform a computer-implemented method comprising:
obtaining a first text collection matched with a target domain and a second text collection including a plurality of samples each describing rewriting between a first text and a second text having a style different from the first text;
training a text generation model of a learning machine with the first text collection and the second text collection, the text generation model having, in a vocabulary, one or more operation tokens indicating rewriting;
creating a seed model used for obtaining the plurality of texts in conjunction with the text generation model, the seed model created by a nonlinear interpolation of a first seed model base trained with the first text collection and a second seed model base trained with the second text collection, the nonlinear interpolation including a plurality of conditions for giving weights for mixing the first and second seed model bases; and outputting a plurality of texts obtained from the text generation model the plurality of texts being configured for training a language model of a speech recognition engine.

17. The computer program product of claim 16, wherein the one or more operation tokens includes one or more insertion tokens and/or one or more deletion tokens, each insertion token indicating insertion of a text part, each deletion token indicating deletion of a text part.

18. The computer program product of claim 16, the method further comprises:
   generating a plurality of tagged texts having at least one operation token using at least the text generation model; and
   applying a rewriting rule to each tagged text to obtain a plurality of untagged texts as the plurality of texts used for training a language model.

19. The computer program product of claim 16, wherein the first seed model base is a topic seed base (T) and the second seed model base is a rewriting seed base (R).

20. The computer program product of claim 19, wherein the topic seed base (T) and the rewriting seed base (R) are unigram language models that provide a probability for each token.

\* \* \* \* \*